United States Patent [19]

Benzaria et al.

[11] 3,720,626

[45] March 13, 1973

[54] ELUTION PROCESS FOR THE REGENERATION OF SPENT ACTIVATED CARBON

[75] Inventors: Jacques Raphael Benzaria, Chambly; Claude Zundel, Neuilly S/Seine, both of France

[73] Assignee: Societe Anonyme: Degremont Societe Generale d'Epuration et d'Assainissement, Saint-Cloud Rueil Malmaison, France

[22] Filed: June 19, 1970

[21] Appl. No.: 47,599

[30] Foreign Application Priority Data

June 20, 1969 France.................................6920827

[52] U.S. Cl. .......................252/413, 210/30, 210/40, 252/412, 252/414, 252/415
[51] Int. Cl. ...............................................B01j 11/02
[58] Field of Search..............252/412, 413, 414, 420; 127/55; 210/30, 39, 40

[56] References Cited

UNITED STATES PATENTS

| 2,236,679 | 4/1941 | Ferguson et al. | 252/413 |
| 3,053,774 | 9/1962 | Walther | 252/414 |
| 2,769,751 | 11/1956 | Paull | 252/414 |
| 3,274,104 | 9/1966 | Hamilton | 252/412 |
| 3,053,774 | 9/1962 | Walther | 252/414 |

FOREIGN PATENTS OR APPLICATIONS 636,752   5/1950   Great Britain.......................252/414

OTHER PUBLICATIONS

Pittsburgh Chemical Co. Technical Booklet "Basic Design Techniques for Activated Carbon Adsorption Systems" Published 1961 (Pat. Off. 9/23/63) pp. 1 & 4.

*Primary Examiner*—Daniel E. Wyman
*Assistant Examiner*—P. E. Konopka
*Attorney*—Littlepage, Quaintance, Wray & Aisenberg

[57] ABSTRACT

Improvement in the process for the regeneration of spent activated carbon combining an aqueous alkaline solution and an organic solvent, such as a lower alcohol.

The spent carbon is first contacted in a column under practically static conditions, and at between 25° and 90°C for 30 minutes to 2 hours with an aqueous alkaline solution, preferably 0.5 to 25 percent by weight sodium hydroxide. An alkaline treatment prepares the elution action of the solvent. The solvent is a lower alcohol, preferably isopropanol combined with water. The solvent is then removed by steam and the carbon is regenerated by an acid treatment. Complete regeneration is obtained.

17 Claims, No Drawings

ELUTION PROCESS FOR THE REGENERATION OF SPENT ACTIVATED CARBON

Regenerated activated carbons have been used for the purification of sugar liquids, drinking water, various secondary products of the foodstuffs industry, industrial waste water from the manufacture of dye stuffs, detergents, phenol derivatives, such as alkyl phenols or nitrophenols.

The object of the invention is an improved process for the regeneration of spent vegetable or mineral activated carbon.

The use of vegetable or mineral carbon in powdered or granular form is well known for the purification of solutions which are placed in continuous or discontinuous contact with the said activated or unactivated carbons; these carbons have the property of retaining certain of the products existing in the solutions treated; the amounts of products retained by these carbons are very variable, from 1 to 30 percent by weight of the purifying carbon, for instance.

The activated carbons used are generally adapted to adsorb the majority of the organic materials in solution.

This adsorption depends on the polarity of the carbon, its structure, its basic nature and various characteristic values, such as the iodine value, methylene blue value, erythrosin value, molasses number, permanganate number, determining, notably, the surface and the distribution of pores in a carbon.

Each type of carbon should be adapted as a function of the polarities and sizes of the molecules to be retained. Carbon adsorption and saturation are closely connected with the concentrations of reagents in the solution to be treated, as well as the method used.

For reasons of economy, it quickly became apparent, mainly because of the high price of these so called activated carbons, that it was necessary to be able to regenerate them, as the known installations, operating on a "lost carbon" system, give excellent results from the point of view of purification, but are difficult to operate economically. Many methods of regeneration have been tried, such as acid treatments with organic or inorganic acids, treatments with alkaline solutions (sodium, ammonia, hydroxide, etc.), with solvents and even gases (nitrogen, helium) and, most frequently, with mixed mixtures, or even with oxidizing chemical solutions.

U.K. Pat. No. 636,752, French Pat. No. 1,409,050 and U.S. Pat. No. 2,763,580 can be cited as documents illustrating the prior art in the field of the regeneration of certain adsorbent materials.

U.K. Pat. No. 636,752 relates specifically to the reactivation of spent adsorbent inorganic materials such as clay, silica gel, bauxite (or alumina), It provides a treatment for spent material combining a first water miscible liquid polar solvent and a second nonpolar solvent immiscible with the first. The organic impurities are extracted and the solvent phases separated. In the preamble to U.K. Pat. specification No. 636,752 it is indicated that it has already been suggested that alkaline substances mixed with solvents should be used as substances for the regeneration of such adsorbent inorganic materials. Examples of alkaline substances are aqueous and/or alcoholic alkali hydroxides or ammonia. The neutral organic solvents used are selected from alcohols, ketones, aromatic and aliphatic hydrocarbons. It is also stated that treatment with an alkali hydroxide dissolved in a solvent, such as alcohol, is very effective to remove acid impurities, but that this treatment has the drawback of subsequently requiring an additional operation consisting in a treatment with strong acid. Although U.K. Pat. No. 636,752 does not concern the problem of the regeneration of activated carbon, it can be cited as a document illustrating the prior art, to show that these lixivation techniques do not give entire satisfaction.

French Pat. No. 1,409,050 relates essentially to the preparation of a special adsorbent carbon, activated by a preliminary operation consisting in contacting said carbon with an aqueous solution containing a lower alcohol and an aromatic hydrocarbon, such as benzene or toluene. This carbon is used to purify solutions containing amino acids, and to separate the said acids. The acids adsorbed can be recovered by elution with an aqueous solution of a lower alcohol (10 to 50 percent by volume) and ammonium hydroxide (1 to 5 percent by volume). Such a patent should be considered as being limited to the preparation of an adsorbent carbon activated in a special manner for the aforesaid application, that is to say, to obtain certain amino acids.

U.S. Pat. No. 2,763,580 describes a process for the purification of sugar liquids in which an aqueous solution of sugar is passed through a bed of granular activated carbon. The saturated adsorbent carbon can be regenerated by washing with an alkali solution containing from 1 to 15 percent solids, and notably a solution of sodium hydroxide or potassium hydroxide.

A drawback common to all the known lixivation processes is that they necessitate large amounts of treatment liquids, ranging, for instance, from 10 to 100 times the volume of carbon treated. Furthermore, the activated carbon rapidly loses its activity as it undergoes successive regeneration steps. It is, therefore, necessary to regularly and continually replace by a new product a relatively large amount of active carbon which gradually becomes saturated, as a result of which the cost of treatments is uneconomic;furthermore, the organic materials are only partially extracted and the remaining ones decrease the activity of the adsorbent material when it is subsequently used.

In addition, when the products retained are organic, other known processes consist in partially calcining the spent carbon at temperatures in the range of 500° to 970°C in furnaces with a controlled atmosphere. A good regeneration requires very accurate conditions of temperature and atmosphere and a minimum of 1 kg steam/kg carbon is necessary to obtain good regeneration.

Operations of the furnace are difficult, they involve a large capital outlay and require careful supervision. Carbon regeneration is poor if calcination is carried out at too low a temperature in an uncontrolled atmosphere, and considerable losses occur due to burning. Regeneration at too high a temperature renders the carbon fragile, resulting in a loss of fines which cannot be disregarded. On the other hand, bad furnace control generates stake gases. As carbon regeneration proceeds, a certain amount of fines is produced which are drawn off in the flue gas. The average loss observed in industrial installations is recognized as being in the range of 5 to 10 percent when furnaces are properly supervised.

The average price of one ton of carbon regenerated on the spot, including absorption of depreciation, can attain 40 to 50 percent the price of new carbon.

Another drawback of the treatment of spent carbon by calcination is that regeneration is not total, and that when the carbon is used again it does not possess all the properties of new carbon; notably, the inorganic salts which may be adsorbed in the carbon are not removed by calcination, which further decreases the adsorption capacity of the carbon as successive operations of regeneration and re-use are carried out.

The present invention does away with the drawbacks of the prior art processes described hereinabove. It makes use of elution technique in a new manner allowing for the nature of the adsorbent used which will be taken as a non-limiting example hereinafter.

The objects of the invention are:
— a process for the regeneration of spent vegetable or mineral carbon by elution under economically more advantageous conditions owing to the small amounts of treatment solutions used with respect to the volume of carbon;
— a process such that carbon regeneration is more complete than in known processes;
— a process which can be used both for granular carbon and powdered carbon;
— a process entailing a very low capital outlay on materials.

Generally speaking, the invention consists in first changing the polarities of activated carbon by means of an alkaline substance, such as an alkali hydroxide, and then displacing the adsorbed substances by a solvent by a new method and under carefully controlled conditions, in removing the solvent by the injection of steam or superheated water and restoring the initial condition of carbon by acid washing.

The invention therefore relates to a process for the regeneration of spent vegetable or mineral activated carbon by contacting it in a column with a combination of an alkaline substance and solvents, characterized in that the alkaline treatment is carried out at a temperature at least equal to the ordinary temperature, for a period of 30 minutes to 2 hours under practically static conditions of contact of the alkaline solution and carbon, an aqueous solution containing at least one organic solvent then being circulated in the column at a different flow velocity, the solvent is removed by injection of steam and the carbon is washed with an acid, after which it can be re-used.

The essential characteristic of the invention resides in the fact that the alkaline treatment is carried out statically, or under conditions of practically stationary flow of the alkaline solution in the column, whereas elution by the solvent is effected under different conditions of velocity. In this description, the expression "practically static conditions of contact," means that during contacting of the carbon and alkaline substance, the latter circulates in the column at a very slow flow velocity or at zero flow velocity. Thus, in batch treatment, flow velocity is zero. In a continuous embodiment, the flow velocity of the alkaline substance is sufficiently slow for the conditions of the duration of contact to be respected. The velocity in all cases being slower than 1 m/hour.

The elution solvent, on the other hand, circulates in the column at a different, higher velocity which can, for instance, reach a velocity as high as 10 m/h.

As an alkaline substance, sodium, potassium or ammonium hydroxide is used; an aqueous solution of sodium hydroxide is preferred. Alkali hydroxide concentrations of 0.5 to 25 percent by weight are suitable for the aqueous solution.

The alkaline treatment temperature lies in the range of 20° to 130°C, preferably in the range of 25° to 90°C and advantageously in the range of 70° to 80°C.

For the solvent treatment step, there is used an aqueous solution of at least one organic solvent preferably selected from lower alcohols and other polar solvents such as acetone and dichloroethane. As a lower alcohol there is used, notably, methanol, ethanol, propanol, isopropanol or butanol. The preferred alcohol for carrying out the process is isopropyl alcohol, owing to its high power of adsorption by carbon, and the ease with which it is recovered. A hydroalcoholic solution containing 20 to 75 percent by volume of isopropyl alcohol can be used advantageously.

The temperature of the solvent treatment depends on the nature of the latter solvent. This temperature is generally preferably lower than — or near to — the boiling temperature of the solvent, or of its solution, at the pressure in the reaction zone. In the case of high temperatures, it is advantageous to carry out regeneration at the vapor pressure of the treatment solution.

The essential characteristic of the invention is that the pre-treatment with the alkaline solution is such that it prepares for elution with the solvent subsequently used, so that the said solvent will completely replace the organic materials and that, consequently, the carbon regeneration will also be effected with maximum efficiency.

It has, moreover, been ascertained that the use of a single hydroalcoholic alkali solution could be suitable in as far as the preliminary pretreatment passage is carried out at a very slow flow velocity. The treatment can then be considered as static in the sense of the present invention, where in the case of a hydroalcoholic sodium hydroxide solution, only the sodium hydroxide is active, the alcohol and water only being carriers. When this step is terminated, the flow velocity can be accelerated by 5 to 10 times and complete elution is then obtained as when the operation is carried out with separate hydroxide sodium and alcohol solutions.

Additionally, as the materials initially retained by adsorption in the carbon are retained in a certain volume of eluant solvent, it is possible to envisage the recovery of organic substances in the measure that they are of economic importance. In this connection, the use of isopropyl alcohol as the elution solvent is advantageous, as this alcohol can be easily and almost completely recovered by the distillation of its azeotrope; finally, the operation is economical owing to the small amounts of elution substance used.

After drying, the treatment of the invention comprises, an injection of steam enabling the solvent, which has taken the place of the products adsorbed by the carbon during use, to be extracted from the carbon. The temperature and pressure of the steam should be adapted to each case; these values can easily be determined by those skilled in the art.

Steam at two bars, optionally superheated, can be used for carrying out the invention. As a variant, it is possible to use hot water under high compression, which is circulated in the column, or even a stream of hot air.

Following this treatment, and in order to reactivate the carbon, the latter is treated with an acid to remove the inorganic derivatives which it has adsorbed, such as sulphur derivatives, carbonates, metal salts, etc. The acid is preferably an inorganic acid such as hydrochloric acid, sulphuric acid or phosphoric acid. It can also be an organic acid such as formic acid or acetic acid.

The final operation can be completed by rinsing in clean water.

The process of the invention can be carried into effect equally well with granular carbon and powdered carbon. Only the equipment used for carrying out the process is different. In the case of granular carbon, the treatment is carried out on a bed of grains which may be as deep as 10 meters. Powdered carbon, on the other hand, is treated in systems which enable it to be retained in thicknesses not exceeding 30 to 40 cm. The flow velocities are then reduced, but the results are similar. It should be noted that the carbons used in the process of the invention, whether they be powdered or granular, have a surface area per unit mass of between about 500 to 1500 m²/g.

The process of the invention is applicable in all cases where reactivation of spent vegetable or mineral activated carbon is necessary. Some fields of application of the invention are, among others:
— the reactivation of activated carbons which have been used for the purification of sugar liquors; these carbons, which can contain up to 20 percent of their weight of organic substances, including amino acids, are reactivated continuously, or in batch operation, in vertical columns having a diameter to height ratio of 1 : 10, using either separated solutions of sodium hydroxide and alcohol, or by the mixed solution with modification of the flow velocity during pretreatment and during elution, this velocity changing, for instance, from 1 to 5.
— the regeneration of activated carbons which have been used for the purification of drinking water.
— the regeneration of activated carbons which have been used for the purification of industrial waste water from factories manufacturing dyes or phenol derivatives, alkyl phenols, detergents or nitrophenols.
— the regeneration of activated carbons which have been used for the purification of domestic or industrial waste water, either for a physicochemical treatment or for a tertiary treatment.

The process according to the invention is also suitable for treating glycerine and sorbitol manufacturing liquors, the first obtained from the soap industry, the second initially obtained from potato starch. The invention provides finally a simple and economical process for the regeneration of activated carbons used in certain foodstuff industries.

In order to put the process of the invention into practice, the spent activated carbon can be extracted for subsequent reactivation and replaced by a new charge.

Two columns can also be operated alternately, one being used for the purification of a liquid containing impurities while the other is either treated and regenerated in situ, or emptied and recharged with new carbon.

Finally, continuous extraction of saturated activated carbon can be effected, and it can be replaced, also continuously, by a new product; many technically perfected installations have been in operation for several years, either using continuous, uninterrupted extraction, or by batch extraction of a portion of the saturated activated carbon, replacing it by an equivalent amount of new or regenerated carbon.

It should also be noted that the process of the invention can also be applied to the regeneration of adsorbent products other than activated carbon, such as molecular sieves, and ion exchange resins among others.

The invention will now be illustrated by the following examples:

EXAMPLE 1

The object of this example is to show the critical aspect of the conditions of flow of treatment solutions in a column of spent, activated carbon as they are provided for in the invention.

A certain amount of carbon is available, this has been used for the purification of waste water from a chemical factory producing organic dyes; this carbon is of a uniform brownish color.

This carbon is loaded into a glass tube having a diameter equal to one tenth of its length ($d$=3cm, $l$ = 30cm); the column of spent carbon is suitably packed to prevent preferential passages; the tube is positioned in a double glass casing through which hot water is run to raise the carbon to a temperature of between 50° and 80°C.

The top of the column is connected to a metering pump which permits the supply of variable and measurable amounts of solutions; the bottom of the column being connected to a glass tube onto which there is secured a photoelectric cell which is connected to a graphic recorder; the flow of colorless liquid through this tube is represented by a zero linear recording; when, on the other hand, a colored liquid flows through this tube, the recorder registers this flow by measuring the opacity thereof, which is a function of the amount of coloring matter in the circulating liquid, this measurement is qualitative and becomes quantitative if the magnitude of the surfaces defined is determined by the lines registered on the graph (the time being given in abscissa and the relative opacity in ordinates).

A. Various liquids are flowed through this column, which if filled and equipped in the manner described, and the results obtained are noted on the recorder. The following facts were observed:

a. nothing is recorded if pure water is flowed through the column
b. a slight, continuous coloration is registered on the recorder is an aqueous solution of sodium hydroxide containing 1 to 5 percent NaOH is flowed through the column;
c. the same observation as in (b) is made with acidulated water, which is inorganic with sulphuric acid or organic with acetic or formic acid.

It is established that, whatever the liquid used, it must be used in amounts of 10 to 100 times the volume of carbon in order to obtain a colorless transit liquid, and the carbon treated is seen to gradually become uniformly black, but in no case does it regain the initial color of new carbon; it can therefore be said that regeneration is only partial, whatever the method of treatment used, whatever the flow velocity of liquids and the temperatures thereof, and whatever the total amount of liquid flowing through said column.

B. The process of the invention is used as a comparison, this trial consists in placing a sodium hydroxide solution containing 40 g of sodium hydroxide per liter, viz normal sodium hydroxide (N), in static contact with the carbon column, in maintaining the temperature of the column at 80°C for a period of 1 hour, and then injecting a hydroalcoholic solution containing 50 percent isopropyl alcohol into the top of the column. Photoelectric measurement, backed up by pH measurements and titrimetry, show that when a volume of aqueous sodium hydroxide substantially equal to the volume of carbon flows through the column it is only slightly opaque, and therefore only has a low dye content but a very high pH, and that the liquid suddenly becomes opaque while the pH of the solution tends to become neutral. Titrimetry shows that practically all the sodium hydroxide passes during the period of slight opacity, and it is also seen that the opaque solution contains no alcohol; as the alcohol is injected, the liquor becomes paler and the alcohol content increases until the alcohol solution runs clear, and after the passage of 2 equivalent volumes of the hydroalcoholic solution, it is seen that the carbon has regained its normal color and that the impurities have been completely washed out of it; it is, therefore, then ready to be treated with steam and then with acid in order to be reused. It was, however, observed that whereas discoloration is continuous and homogenous during the passage of a simple sodium hydroxide solution, it occurs in this case by a downward movement of the coloration zone, as if a colored annular zone descended through the carbon column in a homogenous manner and in one step.

Without limiting the invention to a theoretical interpretation of the phenomena involved, it is thought that:

1. the treatment by the sodium hydroxide containing solution has "prepared" the removal of materials retained on the carbon, probably owing to a change in polarity;
2. the treatment by the alcohol solution has "repulsed" these impurities, and the alcohol replaces these impurities in the pores of the carbon; the alcohol seems to act as an eluant rather than as a solubilizer.

EXAMPLE 2

The aim of this example is to show the synergy of the stages of treatment of the process of the invention.

In the same apparatus as in example 1, carbons which have been used for the decolorization of sugar liquors are treated under the following conditions:

a. a treatment is carried out with aqueous sodium hydroxide alone; after circulation, the solution is found to contain only 0.49 percent extracted material;
b. a treatment is carried out with aqueous isopropyl alcohol alone : the solution is found to contain only 1.4 percent extracted material;
c. the treatment is carried out according to the invention as in example 1 (part B) and the solution is found to contain 2.38 percent extracted material.

A comparison and calculation of the volumes and extracted materials in the three preceding cases (a), (b) and (c) shows that the total amount extracted in case (c) was 140 percent with respect to the treatment with sodium hydroxide alone (a) and 160 percent with respect to alcohol alone (b).

EXAMPLE 3

A solution containing 10 ppm chlorophenol and 5 ppm of various detergents is flowed through a bed of granular inorganic carbon having a surface area in $m^2/$grams of approximately 1,000. When the solution emerges, after this treatment, at a concentration of 10 percent of the starting solution, the carbon is considered as having lost its efficiency. It is ready for regeneration.

After drying, the carbon is treated in a column having a height between 5 and 10 diameters and provided with a double reheating casing.

A solution containing :
— 7 g sodium hydroxide
— 105 g pure isopropyl alcohol
— 128 cc $H_2O$ ;

is introduced into the column and left in contact with the carbon in a stationary regime for 1 hour at 80°C. This solution is then circulated through the carbon at 80°C at a rate of 1 m/h.

The liquid is then drained from the column. Steam is introduced and the solvent recovered. Finally, a 5 percent solution of hydrochloric acid is introduced after the steam.

The carbon obtained is regenerated and can be reused immediately.

EXAMPLE 4

A filtered water from the residues of a dye factory, containing various chemical products which are considered as being impossible to identify, is percolated through a column of granular carbon. The carbon is saturated after 300 liters of the liquid have flowed through the column. About 20 percent organic materials are retained on the carbon. The carbon is then treated as in example 3 given hereinabove. It is then recycled as new carbon. The results obtained with the recycled carbon for adsorption and decolorization of sugar liquors are similar to those obtained with the initial carbon.

EXAMPLE 5

The spent carbon used in the preceding example is treated at 50°C with an ammonium solution containing, by weight, 10 percent ammonia, 60 percent ethanol and 30 percent $H_2O$. Carbon desorption is much longer, and the results show that the carbon has only recovered 85–90 percent of its initial adsorbant properties.

EXAMPLE 6

Water from a factory producing nitrated derivatives, such as that obtained from the manufacture of nitrobenzene or nitrotoluene, is flowed, after filtration, on a column of granular, inorganic or vegetable carbon, having a surface unit area in the range of 1,000 to 1,200 m²/gram.

The column is considered as being saturated when the solution flowing out of the column shows indications of the presence of organic residues.

After drying the column the following mixture is introduced into it:
— 5 percent sodium hydroxide
— 70 percent acetone
— 25 percent water.

The solution is introduced onto the carbon and the whole is left to stand for one hour. The product is then treated as in the preceding examples.

The regenerated carbon is then directly reusable.

EXAMPLE 7

The same spent carbon is used as in the preceding example 6, and it is treated under the same conditions with a solution comprising (by weight)
 5 percent sodium hydroxide
 80 percent dichloroethane
 15 percent water Results equivalent to those of example 6 are obtained.

EXAMPLE 8

This example relates to a test treatment, by activated carbon, of nonconcentrated sugar liquors before evaporation.

In a column consisting of a vertical glass tube 130 cm in length and 10 cm in diameter provided with a porous horizontal plate at the bottom thereof, there was flowed an aqueous slurry consisting of saturated activated carbon from a column used for treating sugar liquors; the water which forms part of the slurry still charged with elements to be treated is flowed through the porous surface; the column so constituted is checked to ensure its perfect homogeneity, without faults or holes.

After the saturated activated carbon has been dried in an oven at 100°C, it was examined to confirm that, at equal volume of identical new carbon, it showed a weight increase generally of between 15 and 25 percent, the maximum corresponding to a saturation level such that the apparent density of the saturated activated carbon was 0.650.

The volume of the adsorbent column being approximately 10 liters, hot water at 90°C was first flowed through it to raise the temperature of the whole to about 60° to 70°C. As a comparative test, 100 liters of an aqueous sulphuric acid solution at 10 percent by weight of acid previously heated to 100°C was flowed downwardly; the liquid at the column outlet was seen to be colored (the color of strong tea), the column was then washed with hot water; after having emptied the column, a portion of the carbon was dried, and after sampling the adsorbent carbon it was seen that, based on an identical volume of new carbon, the weight remained substantially higher for a value between 105 and 115 percent that of new carbon.

Another comparative trial was then carried out in the same manner, using a sodium hydroxide solution at 10 percent by weight of sodium hydroxide and under the same conditions, it was seen that an equal volume of new carbon and dried, treated carbon weighted between 103 and 110 percent, to the disadvantage of the carbon treated with the sodium solution, the liquor at the outlet being as dark as concentrated coffee.

A trial was then carried out according to the invention, using an aqueous solution containing between 30 and 60 percent by weight of isopropyl alcohol and 10 percent by weight of sodium hydroxide under the same conditions as above, that is, at a temperature of 60° to 80°C. This solution was left standing in contact with the spent carbon for 1 hour, the same solution was then flowed at a rate of 1.30 m/hour for 2 hours.

It was then found that the same volume of new active carbon and spent carbon regenerated under these conditions were of substantially the same weight, and that the iodine values were similar to those of new carbon. In this last trial, total extraction of the products retained during the clarification and purification treatment of sugar liquors was obtained.

We claim:

1. A process for regenerating spent vegetable or mineral activated carbon, comprising (a) subjecting said carbon to an alkaline treatment by contacting said spent carbon in a column with an aqueous alkaline solution having a flow velocity of zero to less than 1 m/hour through said column at a temperature of about 20° to 130°C., for a period of about 30 minutes to 2 hours to change the polarity of the carbon and condition it for solvent displacement of the adsorbed substances on said carbon, (b) eluting said adsorbed organic substances by solubilizing and displacing said adsorbed organic substances on said carbon with an aqueous organic solvent eluting solution, which is passed through said carbon in said column at a higher flow velocity than said alkaline solvent, and wherein said organic solvent is selected from the group consisting of lower alcohols, acetone and dichloroethane, (c) removing said eluting solvent residue from the carbon by the injection of steam into the said carbon, and (d) washing the carbon with acid to remove adsorbed inorganic material.

2. The process of claim 1 wherein said aqueous alkaline solution is selected from the group consisting of aqueous solutions of potassium hydroxide, sodium hydroxide and ammonium hydroxide.

3. The process of claim 2 wherein said alkaline liquid is an aqueous solution containing 0.5 to 25 percent by weight of sodium hydroxide.

4. The process of claim 1 wherein said alkaline treatment temperature is in the range of 25° to 90°C.

5. The process of claim 1 wherein said alkaline treatment temperature is between 70° and 80°C.

6. The process of claim 1, wherein the elution solvent is selected from the group consisting of methanol, ethanol, propanol, isopropanol and butanol.

7. The process of claim 6 wherein the elution solvent is an aqueous solution containing 20 to 75 percent by volume of isopropyl alcohol.

8. The process of claim 1 wherein said temperature of the treatment with the elution solvent is lower than the boiling temperature of said solvent at the pressure in the reaction zone.

9. The process of claim 1 wherein said temperature of treatment with the elution solvent is approximately that of the boiling temperature of said solvent at the temperature in the reaction zone.

10. The process of claim 1 which is carried out continuously and wherein the said alkaline treatment is carried out at a slow flow velocity of said alkaline solution over the carbon, the said velocity not exceeding 1 m/h.

11. The process of claim 1 wherein the circulation velocity of said elution solvent is faster than 1 m/h and up to and including 10 m/h.

12. The process of claim 1 wherein a aqueous alkaline hydroalcoholic solution is used for the alkaline treatment step (a) and for the elution step, (b) in which case the circulation of the said solution during the alkaline treatment is carried out under practically stationary flow conditions, whereas the circulation of the said same solution during the elution step is effected at a different velocity above lm/h.

13. The process of claim 12 wherein the flow velocity of the said aqueous alkaline hydroalkaline solution during the elution step is about 5 times faster than during the alkaline treatment.

14. The process of claim 1 wherein said activated carbon has a surface area in the range of 500 to 1500 $m^2/g$.

15. The process of claim 1 wherein, instead of circulating steam over the said activated carbon it is contacted with super heated water under pressure.

16. The process of claim 1 wherein hot air is injected onto the said activated carbon instead of steam.

17. The process of claim 1 wherein after the said steam said acid is selected from the group consisting of inorganic hydrochloric, sulphuric and phosphoric acids and the organic acetic and formic acids.

* * * * *